United States Patent
Pein (10) Patent No.: US 7,765,152 B2
(45) Date of Patent: Jul. 27, 2010

(54) SYSTEM AND METHOD FOR DETECTING TRADING OPPORTUNITIES IN FINANCIAL MARKETS

(75) Inventor: Howard Pein, Harrison, NY (US)

(73) Assignee: Codestreet, LLC, New York, NY (US)

( * ) Notice: Subject to any disclaimer, the term of this patent is extended or adjusted under 35 U.S.C. 154(b) by 121 days.

(21) Appl. No.: 11/773,296

(22) Filed: Jul. 3, 2007

(65) Prior Publication Data
US 2008/0120220 A1    May 22, 2008

Related U.S. Application Data

(60) Provisional application No. 60/860,241, filed on Nov. 20, 2006, provisional application No. 60/892,322, filed on Mar. 1, 2007.

(51) Int. Cl.
*G06Q 40/00* (2006.01)
(52) U.S. Cl. .................. 705/38; 705/35; 705/36 R; 707/756; 707/776
(58) Field of Classification Search .................. 705/38
See application file for complete search history.

(56) References Cited

U.S. PATENT DOCUMENTS

| | | | | |
|---|---|---|---|---|
| 5,845,266 A | * | 12/1998 | Lupien et al. | 705/36 R |
| 5,924,083 A | * | 7/1999 | Silverman et al. | 705/37 |
| 6,098,051 A | * | 8/2000 | Lupien et al. | 705/36 R |
| 6,321,212 B1 | * | 11/2001 | Lange | 705/36 R |
| 6,876,309 B1 | * | 4/2005 | Lawrence | 340/825.26 |
| 6,983,259 B1 | * | 1/2006 | Foray et al. | 705/37 |
| 2002/0120546 A1 | * | 8/2002 | Zajac | 705/37 |
| 2003/0120585 A1 | * | 6/2003 | Rosenblatt | 705/37 |
| 2005/0187858 A1 | * | 8/2005 | Graham et al. | 705/37 |
| 2005/0228748 A1 | * | 10/2005 | Togher et al. | 705/37 |
| 2005/0240513 A1 | * | 10/2005 | Merold | 705/37 |
| 2005/0283426 A1 | * | 12/2005 | Krishnasami et al. | 705/37 |
| 2006/0100954 A1 | * | 5/2006 | Schoen | 705/37 |
| 2007/0239591 A1 | * | 10/2007 | May | 705/37 |

* cited by examiner

*Primary Examiner*—Kirsten S Apple
(74) *Attorney, Agent, or Firm*—Thompson Hine LLP (57) ABSTRACT

A system and method for facilitating trading in financial markets is presented. The system and method provides dealers, salespersons, and traders of securities the ability to anonymously share their own or their client's interest to trade securities, to identify and match potential trading opportunities between the parties, and to automatically notify dealers, salespersons and traders about such potential trading opportunities. The system and method detects a potential trade of a client or dealer, searches a plurality of other dealers and their clients for compatible second potential trades, identifies matching trades between the parties, alerts one or more of the dealers of the matching trades, and facilitates trades between the parties while maintaining their anonymity.

28 Claims, 6 Drawing Sheets

SYSTEM AND METHOD FOR DETECTING TRADING OPPORTUNITIES IN FINANCIAL MARKETS

CROSS-REFERENCE TO RELATED APPLICATION

This application claims the benefit of U.S. Application No. 60/860,241 filed on Nov. 20, 2006 and 60/892,322 filed on Mar. 1, 2007.

BACKGROUND

1. Technical Field

The present invention relates generally to systems and methods for facilitating trading in financial markets, and in particular, to a system and method for providing dealers, salespersons, and traders of securities to anonymously share their own or their client's interest to trade securities, to identify and match potential trading opportunities between clients, and to automatically notify dealers, salespersons and traders about such potential trading opportunities.

2. Background

Fixed income security refers to a type of investment that provides for certain agreed payments between one party and another. For example, when a company issues debt to raise funds backed by the company's assets, it is called a Corporate bond and when a mortgage company sells bonds to raise money to provide mortgages and the debt is secured by the mortgages the company issues, it is called a Mortgage bond.

Interest rates change over time, based on a variety of factors, particularly rates set by the Federal Reserve. For example, if a company wants to raise money for expanding or improving its business and not a lot of people in the market have free cash to lend, the company will have to offer a high rate of interest (coupon) to get people to buy their bond. In contrast, if there are a lot of people in the market trying to get a return on their money, the company can offer a lower coupon. Fixed income securities are normally traded on the open market, unlike stocks which are traded on exchanges. All fixed income securities from any entity have risks including but not limited to interest rate risk, currency risk, default risk, reinvestment risk, liquidity risk, credit quality risk, political risk, and tax adjustment risk amongst other risks.

Although investors may trade marketable bonds among themselves, trading of bonds is typically done through a bond dealer, or more specifically, through the bond trading desk of broker-dealers. Broker-dealers orchestrate the buying and selling of bonds by connecting all of the interested players (brokers), as well as, by making a market for bonds (dealer). That is, a dealer has traders who are responsible for knowing all about different groups of bonds and are able to quote a price to buy or sell bonds in those groups. Therefore, the dealer provides liquidity for such buying and selling of bonds. Dealers also buy and sell bonds amongst themselves for further trading with its clients or other dealers' traders and clients.

In the fixed income markets, trading of fixed income securities has traditionally been accomplished via an over-the-counter market, with bond dealers and traders negotiating and completing trades either over the phone or via electronic platforms that facilitate communication between the trading parties. In a typical transaction, a bond salesperson learns that their desk is trying to trade a specific fixed income security, or bond, and determines whether it may be of interest to one of his/her customers. The salesperson calls the customer and offers the trade (either sale or purchase) of the security.

More recently, the emergence of electronic request for quote (RFQ) systems and pure electronic matching systems have threatened the role of the traditional fixed income salesperson. However, there is a problem with RFQ and matching systems in that for a trade to be consummated, these traditional systems rely on specific interest in a particular security on the part of the buyer and the seller at the same time. While this is appropriate for highly liquid markets, it is not a particularly appropriate paradigm for markets that are not particularly liquid, such as secondary trading of corporate bonds or mortgages. In these secondary markets, there is usually not someone waiting to take the other side of the trade for a specific security that is easily identifiable (unlike the situation with highly liquid instruments where it is typically much easier to identify the trading counterparty). In less liquid markets, it often becomes a challenge to identify parties that want to take counter positions in a particular trade and therefore it is often the case that interest to buy is expressed in terms of a range of attributes which apply to a number of securities so that the likelihood of identifying a potential selling counterparty increases. That is, the seller's general or specific interest in trading fixed income securities having certain attributes must match the buyer's general interest in trading securities with overlapping attributes. Traditionally, the salesperson and trader perform this pairing of interests of a buyer and seller. The salesperson learns the relevant trade criteria of his customer and then proposes trades of particular securities that meet his customer's objectives. Being good at making these pairings (consummating a trade) is how good traders and salespeople differentiate themselves and where significant revenues are derived.

However, a disadvantage with relying on a trader or salesperson is that it is difficult for a trader and salesperson to process all of the available market and financial data to identify the numerous trading opportunities available at any one moment. Another disadvantage for a trader and salesperson is that he/she must be capable of absorbing and analyzing a lot of information quickly—and doing so with nothing but their memories, notebooks, and computers to support them. The salesperson also must be capable of matching the current trading opportunities with his/her many clients, wherein each client may have a slightly different trading goal.

Accordingly, a system and method is needed for quickly and efficiently processing all of the current and historical market and financial data relevant to the trading of fixed income securities with a salesperson's customers in order to identify logical trading opportunities with those customers. A system and method is needed that is readily available and easy to use, displays all of the available market data and research data, and exposes trading opportunities where there may be potential interest in doing a trade for a particular market participant (client). A system and method also is needed that is easily adaptable for operating on both a salesperson's and trader's trading desk. A system and method is further needed that quickly notifies the availability of a trading opportunity to both salespersons and traders.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawings in which the reference number first appears.

DETAILED DESCRIPTION OF THE INVENTION

System Overview

The system and method of the invention provides salespersons and traders with immediate notification of trading opportunities of fixed income securities. In particular, the system and method describes a sell-side fixed income system for (a) processing current and historical trade, portfolio, inquiry, market data, credit and research information, (b) extracting potential trading opportunities between parties, and (c) exposing these trading opportunities to salespersons and traders without exposing the identity of the party who potentially may want to take the opposite side of the trade. The potential to trade is shown via the GUI to the potential participants. The system and method has appropriate features to allow the participants to transact and complete a trade, then have the trade cleared without either of the parties having to give up their identity. The net result is a far more appropriate facility for matching interest in the fixed income community where securities do not have the same liquidity and depth of market as do more liquid asset types such as equities and foreign exchange. Although the system and method are particularly applicable to facilitate the trading of fixed income securities, it is apparent to one having ordinary skill in the art that the embodiments disclosed herein would be applicable to the trading of other assets having similar liquidity difficulties.

Figure 1:
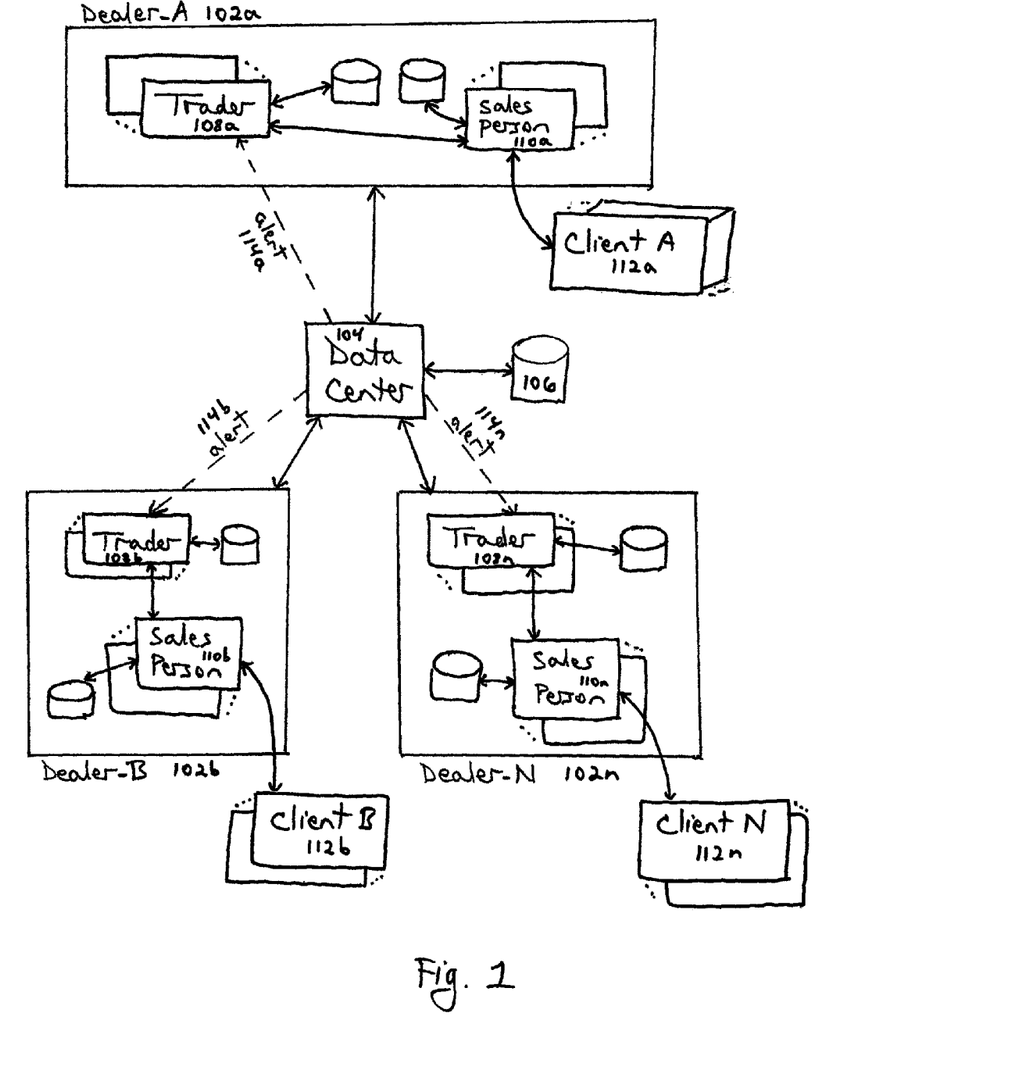
FIG. 1 is a block diagram illustrating an overview of the present system.

One embodiment of the present system and method is shown in FIG. 1. This system and method (collectively, system 100) for detecting trading opportunities enable users at multiple dealers, such as Dealer-A 102a, Dealer-B 102b, and Dealer-N 102n (each commonly referred to as dealer 102) to access and participate in the system 100 as a single community, as well as being part of their own local community within their particular dealer 102. Each dealer 102 has a plurality of traders, such as trader 108a of Dealer-A 102a, trader 108b of Dealer-B 102b, and trader 108n of Dealer-N 102n; sales persons, such as sales person 110a of Dealer-A 102a, sales person 110b of Dealer-B 102b, and sales person 110n of Dealer-N 102n; and clients, such as client-A 112a of Dealer-A 102a, client-B 112b of Dealer-B 102b, and client-N 112n of Dealer-N 112n. For convenience, each of the traders 108a, 108b, and 108n may commonly be referred to as trader 108; each sales person 110a, 110b, and 110n may commonly be referred to as sales person 110; and each of the clients 112a, 112b, and 112n may commonly be referred to as client 112. The sales persons 110 interact with clients 112 in the buying and selling of bonds, where a client 112 may be an individual investor, pension fund manager, bank, trust company, insurance firm, or other establishment. A trader 108 is the interface between the sales persons 110 of its dealer 102, e.g., Dealer-A 102a, and the traders 108 of other dealers 102, e.g., Dealer-B 102b and Dealer-N 102n.

As noted above, traditionally, client interest on a dealer desk is shared, at best, verbally between the local salesforce. In contrast, the present system 100 allows trading opportunities for a client, such as Client-A 112a, of Dealer-A 102a, to be matched with an interest to trade with a different client, such as Client-B 112b, of Dealer-B 102b. Therefore, the system 100 hosts the trade offering across multiple dealers 102, thereby allowing the sophisticated algorithms that process the data for a single dealer 102 to be applied across the data for multiple dealers, e.g., Dealer-A 102a, Dealer-B 102b, and Dealer-N 102n.

The system 100 identifies potential trades and sends alerts 114a, 116b, and 114n (collectively alerts 114) to dealers 102a, 102b, and 102n who then negotiate and consummate a trade through a single data center 104 which accesses one or more databases 106. The use of a single data center 104 is for convenience and the functionality of the present invention may be achieved via different but comparable configurations as would be known to one of ordinary skill in the art, including but not limited to implementations such as redundant data centers or multiple geographically distributed data centers.

System Architecture

Logical Tiers

Figure 2:
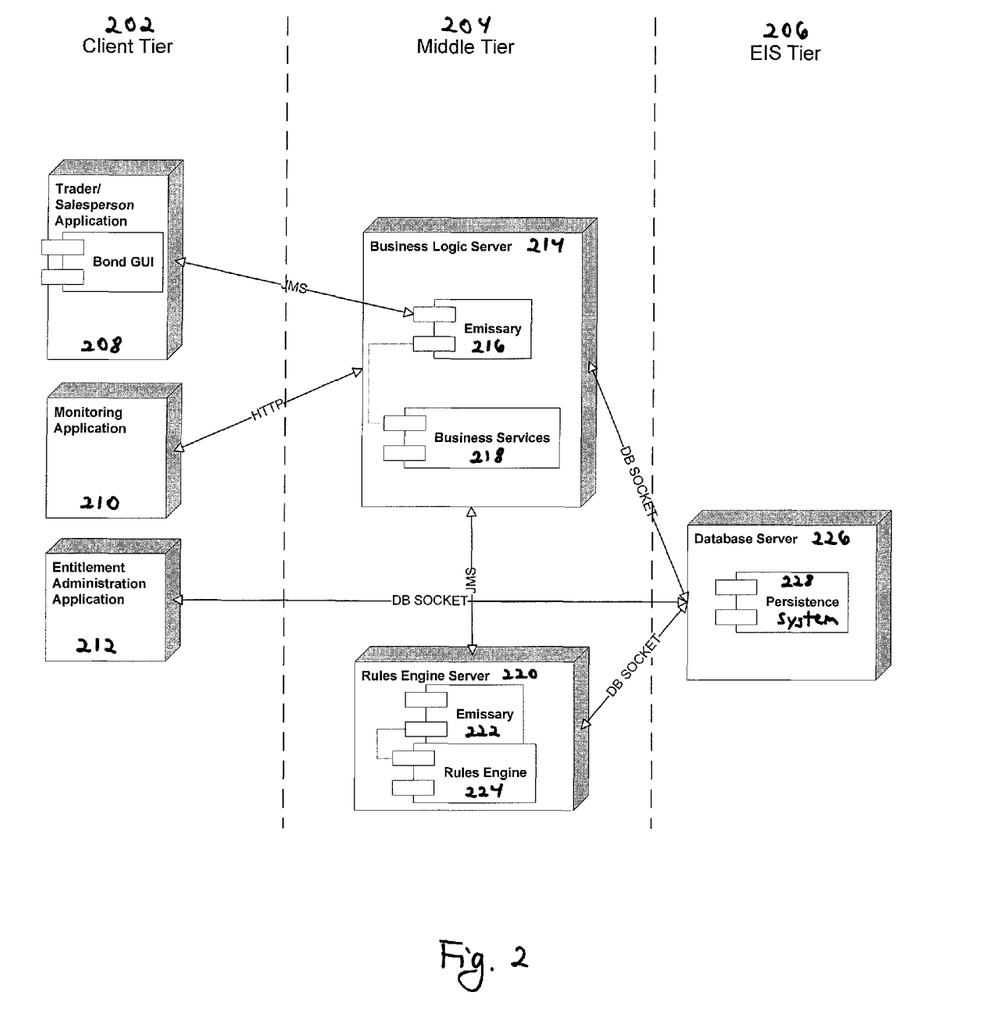
FIG. 2 is a block diagram illustrating the logical tiers of the system architecture.

In the embodiment shown in FIG. 2, the system 100 is organized in three logical tiers: the client tier 202 wherein a salesperson/trader has a Graphical User Interface (GUI) executing on a desktop, the middle or business logic tier 204, and the enterprise information system (EIS) tier 206 providing a data persistence layer. The present invention uses middleware, such as the commercially available TIBCO Enterprise Message Service (EMS), to facilitate communications among client and server applications. Middleware provides a stable high performance messaging platform, adds built-in support for multiple client APIs (C/C#/Java), and facilitates system design and development. The middleware, client tier 202, middle tier 204, and EIS tier 206 provide means for dealers to communicate and means for alerts and notifications to be sent to dealers.

The system 100 is hosted so that the middle tier 204 and EIS layer 206 reside in a single data center 104 with appropriate provisions made for redundancy and failure in the servers, computer systems and data networking equipment. However, that is for convenience purposes only, and as would be known to one of ordinary skill in the art the individual system components could theoretically be distributed among multiple data centers. A GUI executes on a user's computer and communicates with the data center 104. Dealer's 102 specific data is maintained in a common persistence layer fabric that can be processed as a single composite dataset. Thus, any dealer 102 that signs up to use the system 100 immediately becomes a part of the trading community. That dealer's 102 data is reviewed and matched against the data of all of the other dealers 102 to identify and extract potential trading opportunities.

The client tier 202 manages the interaction of end users with the system 100, and consists of four components: Trader/Salesperson application 208, System Monitoring application 210, and entitlement administration application 212. In particular, the client tier 202 consists of client applications that interact with the Middle Tier 204 via request/response messages. Typically, these client applications are graphical user interfaces (GUI) which vary based on the role of the user which is a salesperson 110 or trader 108. However, any client application that implements an application programming interface (API) message can interact with the middle tier 204 to access and use the system 100. Traders 108 and salespeople 110 interface with the system 100 via the client tier 202 wherein each such trader 108 and salesperson 110 has a GUI to a trader/salesperson application 208 on his/her desktop.

The middle tier 204 manages user sessions of the system 100 by processing requests made by the trader/salesperson applications 208 in the client tier 202 and providing access to business services 218 which may be hosted in-process or remotely available. The middle tier 204 has three major components managed on a business logic server 214 and a rules engine server 220. The business logic server 214 has an emissary 216 and business services 218 object, while the rules engine server 220 has an emissary 222 and a rules engine 224.

Within the business logic server 214, the emissary 216 is the point of contact for communicating with a user of a client application, servicing such user requests, maintaining a user's state, applying entitlements, and distributing information to such users. The emissary 216 relieves the business services 218 object from the burden of managing all the communications with client applications in the client tier 202. Communication between the emissary 216 and the business services 218 object is preferably via a synchronous API interface. An abstract factory provides various implementations of such an interface, thereby providing a layer of indirection so that both local and distributed implementations are provided. For example, a local implementation is based on normal Java classes, while a distributed implementation is based on a distributed call, such as a call to a distributed process using JMS, or SOAP, or J2EE Session Bean over RMI.

There are important differences between synchronous and asynchronous processing models. Asynchronous behavior imposes significant design and development overhead. For example, accessing the business services 218 object asynchronously implies that the emissary 216 is prepared to receive a response at some point in time after the request has been submitted. As a result, the emissary 216 is required to cache the session state. Furthermore, the emissary 216 must be prepared to roll back state changes if the request fails. In contrast, a synchronous interface allows for the emissary 216 to know if the request succeeded or if an exception was raised. This is very useful in terms of grouping closely together the request to the business services 218 and any compensating actions based on the failure of the request to the business services 218. It also makes testing the business services 218 API much easier.

There are instances when a business services 218 is only available asynchronously. For such cases, the system 100 includes a wrapper service to encapsulate the complexity of asynchronous processing and present a synchronous interface to the emissary 216. As a result, the emissary 216 is not aware that it is interacting with asynchronous business services 218.

Business services 218 objects provide the domain model and encapsulate system 100 data as well as behavior. These business services 218 objects are plain old Java objects (POJO) and the business logic server 214 API is largely written in terms of these business POJO.

The rules engine server 220 has an emissary 222 for being the point of contact for communicating with, and servicing requests of, the business logic server 214. The rules engine server 220 provides a means for analyzing trade information and creating matching trades. The rules engine 224 of the rules engine server 220 has an architecture that consists of an inference engine, an execution engine, a working memory, and a rule base which consists of the matching rules that have been loaded into the rules engine 224. The rules engine 224 is capable of pattern-matching and can be any rule engine as would be known by one of ordinary in the art. Example rule engines include the JBoss JRules rule engine and the Jess rule engine, but other rule engines are contemplated as well. Rules are typically loaded when the rules engine 224 is initialized. The working memory contains all facts that have been loaded into the rules engine 224. A fact is the most basic unit of information with which a rules engine 224 can work, such as the business objects of interest, e.g., trades, axes, and trade inquiries. Unlike the rule base, working memory is more volatile. For example, when a rule is fired it may change the working memory by asserting, updating, or retracting facts. The pattern-matcher in the rules engine 224 is responsible for applying rules to the contents of working memory to create the conflict set, i.e., the set of unordered rules that are candidates for execution. After constructing the conflict set, the inference engine applies various strategies—only some of which are exposed via the rules engine API—to order the conflict set and create the agenda. The agenda is the list of rules and their respective order in that list utilized to look for matches between traders 108. In this embodiment, the rule engine 224 will typically take into account the specificity of rules and the relative age of the premises in the working memory during conflict resolution. For example, a rule with 4 conditions (left hand sides) might be deemed more specific than a rule with 3 conditions. In one embodiment, the rule engine 224 allows the rule author to explicitly assign a salience value to each of the rules. Finally, the first rule on the agenda is fired (possibly altering the working memory) and the entire process is repeated.

For example, one rule for identifying trading opportunities might be as follows: a potential trade exists if 1) there is a request indicating potential interest in a market segment, and if 2) there is a holder of a bond in that market segment, and if 3) the sale of the bond at the current price would yield a profit given the current price of the bond, less the holder's cost of the bond and changes in the bond that are associated with changes in the overall market. That rule will trigger when applied to the following facts: a) customer A purchased a bond from dealer A; b) the current price of the bond has increased relative to the overall market; and c) dealer B has customer B who is inquiring into trading opportunities in that same sector of the market. The rule engine 224 will detect that there is a potential unwind situation, whereby customer A of dealer A is encouraged to take his profit and customer B of dealer B wants to buy that bond because it fits his desire to buy into that sector. In this example, dealer A would be notified that customer A has a bond that could be of interest to customer B of dealer B, even if customer A was not necessarily actively offering the bond up for sale.

The timing of rule engine invocation, i.e., when the execution cycle described above is initiated, is implementation specific. In general, the rules engine 224 allows other applications, such as the business logic server 214, to explicitly initiate the execution cycle via the rule engine 224 API. In addition, the rules engine 224 provides methods to execute the rules engine 224 in its own thread of execution, thereby controlling the initiation of the execution cycle is up to the rules engine 224. A beneficial result of this is that the rules engine 224 can rapidly detect new matching trades 512 as they are created as a result of changing market conditions. These new trading opportunities may not have existed when the users first entered their potential trades 510, but later become matching trades 512 as a result of changes in the market. The system 100 therefore enables traders 108 to quickly identify and present new trading opportunities to their clients 112.

In an alternative embodiment having an in-process rules engine configuration, the business logic server 214 contains an embedded rules engine 224. In this configuration, the business services 218 of the business logic server 214 interacts directly with the rules engine 224. This configuration may be preferable when the number of rules is small and the rate of change in facts is low.

The enterprise information system (EIS) tier 206 provides access to the system's database(s) and any existing enterprise systems. The EIS tier 206 has a database server 226 which consists of two components: a database and other enterprise information repositories such as LDAP, file system, etc. In one embodiment, the EIS tier 206 employs the commercially available Hibernate system as its object/relational database, persistence and query service (persistence system 228). Although used for convenience, any comparable persistence system can be used to develop persistent classes having object-oriented functionality, including but not limited to, association, inheritance, polymorphism, composition, and collections. Queries are expressed in portable SQL extensions (HQL) or in native SQL.

In the persistence system 228 of the EIS tier 206, critical data entities of the system 100, e.g., such as trades and axes information, persist in a relational database. Also, the mapping of application objects to the relational database uses the following design patterns: domain model, identify, data mapper, and optimistic offline locking. Thus, the business services 218 of the business logic server 214, the entitlement administration application 212 of the client tier 202, and the rules engine 224 of the rules engine server 220 access the data of the persistence system 228 via the EIS tier 206.

Figure 3:
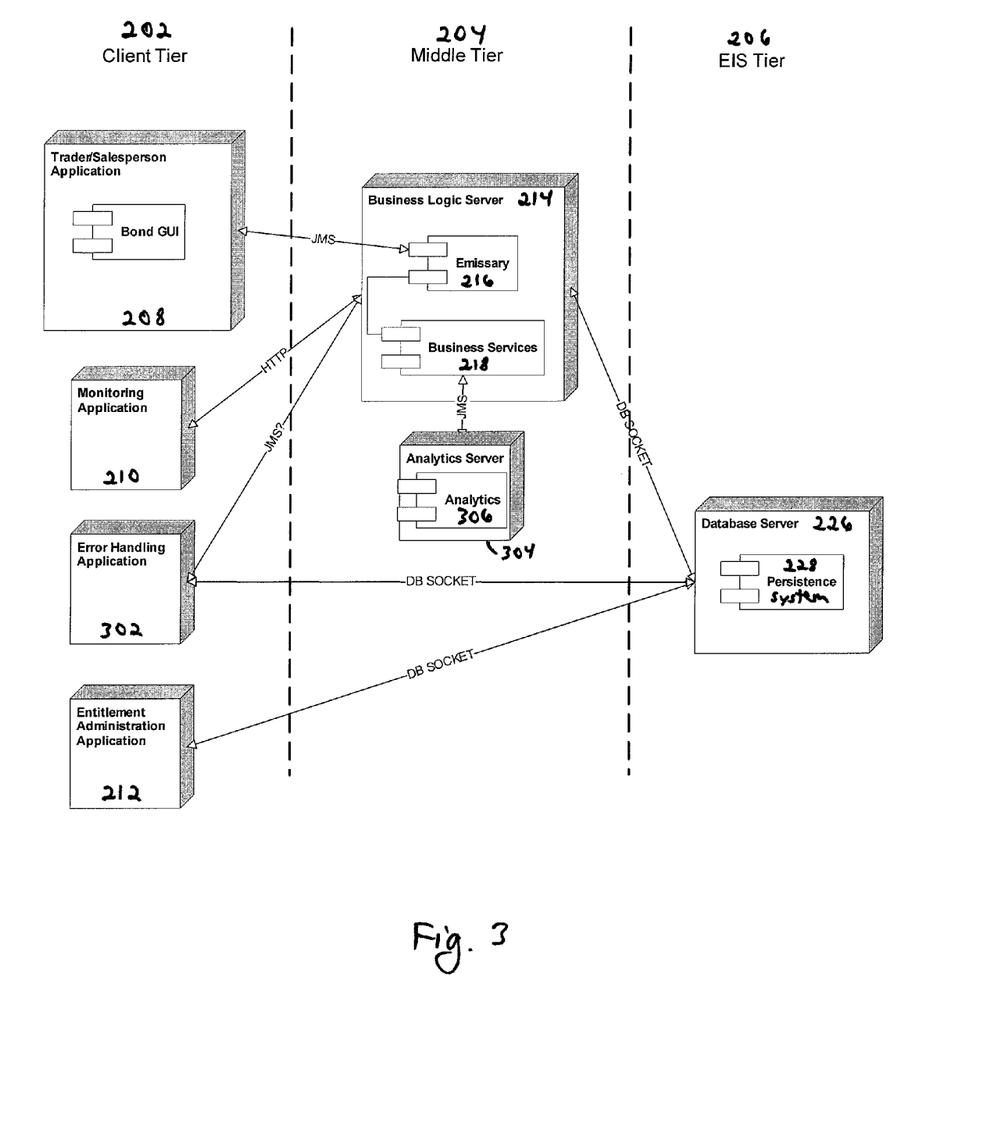
FIG. 3 is a block diagram illustrating an alternative embodiment of the system architecture.

Alternatively, as shown in FIG. 3, one or more of the functions of the middle tier 204 are hosted remotely. For example, in this embodiment a remote, external analytics server 304 has an analytics engine 306 for communicating with the business services 218 via a well-defined API such that the business services 218 is an out-of-process user. Therefore, the middle tier 204 is configured to call out to the analytics server 304 at appropriate points in its processing while the business services 218 itself processes a request from the client tier 202. In fact, the middle tier 204 need not notice any difference in execution (calling structure or time delay) between an in-process configuration of FIG. 2 and a remote analytics server 304 configuration of FIG. 3.

The client tier 202 of this alternative embodiment also has an error handling application 302 for receiving error messages, e.g., a server response error or a business object error. Although the middle tier 204 is responsible for managing a session for the system 100, the client tier 202 has to be able to handle certain error conditions. For example, if client-A 112a is connected to a first emissary 216 and client-A 112a fails before the emissary 216 has published a message to client-A 112a, then the emissary 216 may retain the message for later delivery, if the message is persistent and does not expire. If client-A 112a restarts, the message from the terminated session would then be delivered to client-A 112a. In this case, the error handling application 302 must discard all messages to client-A 112a that are not from the current session.

Tier Design

The logical tiers of one embodiment may be implemented in a number of different structures. The following discussion provides architectural details on one embodiment of the present invention, but it should be known that other architectural structures are equally applicable.

The client tier 202 provides users, such as traders 108 and sales persons 110, a rich user experience and seamless integration with desktop applications such as Microsoft Excel. In one embodiment, trader/salesperson applications 208 are written in C#/.NET to allow rich user interfaces.

The middle tier 204 is designed using the well-known pipeline design which also is ported for use in the client tier 202. Interaction with the middle tier 204 is accomplished using JMS, and specifically, TIBCO EMS is selected as the JMS provider. In alternative embodiment, the interaction with the middle tier 204 is accomplished using Web Services/SOAP.

The processing of the middle tier 204 commences upon receipt of an incoming user request from the client tier 202 and is handled by a processing pipeline. This pipeline design is based on the pipes and filters architectural pattern. In this pattern, the task of a system is divided into several sequential processing steps. Each processing step is implemented by a filter component. The filters are connected by pipes and the output of one filter is used as the input to the subsequent filter.

The middle tier 204 is scaled by deploying multiple JMS daemons and/or multiple emissary processes in any number of configurations. The simplest possible deployment consists of a single JMS daemon and a single emissary process, where in this deployment the login JMS daemon and the normal message processing daemon are one and the same. In another deployment, there is one JMS daemon and two emissary processes wherein each emissary hosts a separate user session. Typically, in such deployments the system 100 is being throttled by the processing at the emissary. Scalability is achieved by adding additional emissary processes. Additionally, in alternative embodiments, the middle tier 204 may deploy multiple JMS daemons due to geographic distribution and/or very large number of clients accessing the client tier 202.

Figure 4:
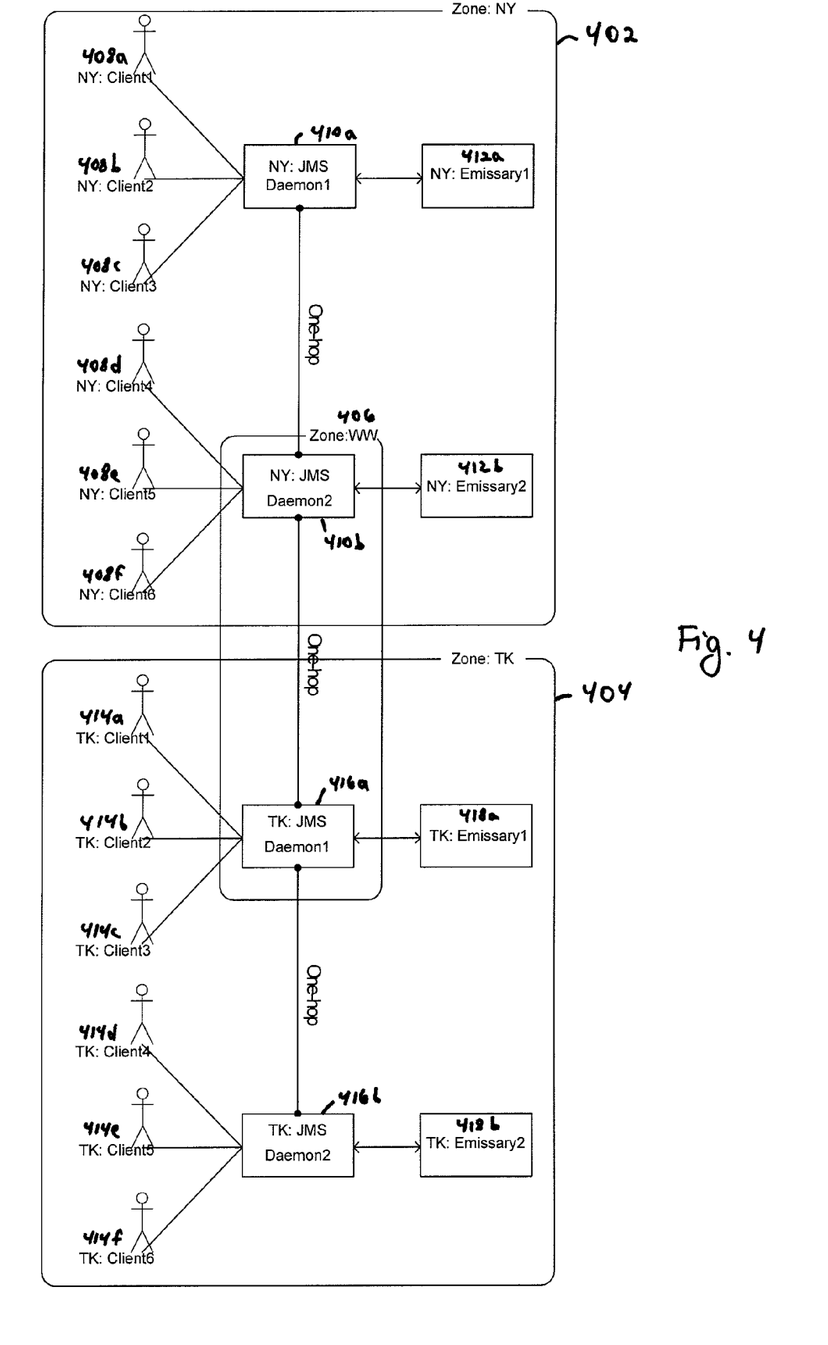
FIG. 4 is block diagram illustrating an embodiment of a distributed system architecture for supporting a plurality of users in different geographic areas.

When a deployment is geographically distributed, with each geographic location running multiple JMS daemons, connecting the two or more locations is best achieved by setting up zones. As shown in FIG. 4, there are two zones—New York (NY) 402 and Tokyo (TK) 404. In addition, there is an overlapping zone WW 406. This embodiment illustrates a distributed system where multiple New York clients 408a-f, such as traders 108 and sales persons 110 located in New York, and multiple Tokyo clients 414a-f, such as traders 108 and sales persons 110 located in Tokyo, access the system 100 of the present invention to identify, negotiate and consummate a trade. The NY clients 408a-f of the client tier 202 access the middle tier 204 through NY:JMS Daemon1 410a and NY:Emissary1 412a, as well as through NY:JMS Daemon2 410b and NY:Emissary2 412b. Similarly, the TK clients 414a-f of the client tier 202 access the middle tier 204 through TK:JMS Daemon1 416a and TK:Emissary1 418a, as well as through TK:JMS Daemon2 416b and TK:Emissary2 418b. The two zones communicate via the connection of NY:JMS Daemon2 410b and TK:JMS Daemon1 416a.

In this embodiment, when a NY:Emissary1 412a publishes a message to NY:JMS Daemon1 410a, the message travels one hop to NY:JMS Daemon2 410b. When the message reaches NY:JMS Daemon2 410b, the message crosses into zone WW 406 and its hop count is reset to zero. Since the hop count of the message is zero, NY:JMS Daemon2 410b forwards the message to TK:JMS Daemon1 416a where the message crosses zone boundaries again and enters zone TK 404. TK:JMS Daemon1 416a forwards the message to TK:JMS Daemon2 416b. The result of this scheme is that each user of the system 100 is in complete communication with all other users.

System Operation

Figure 5:
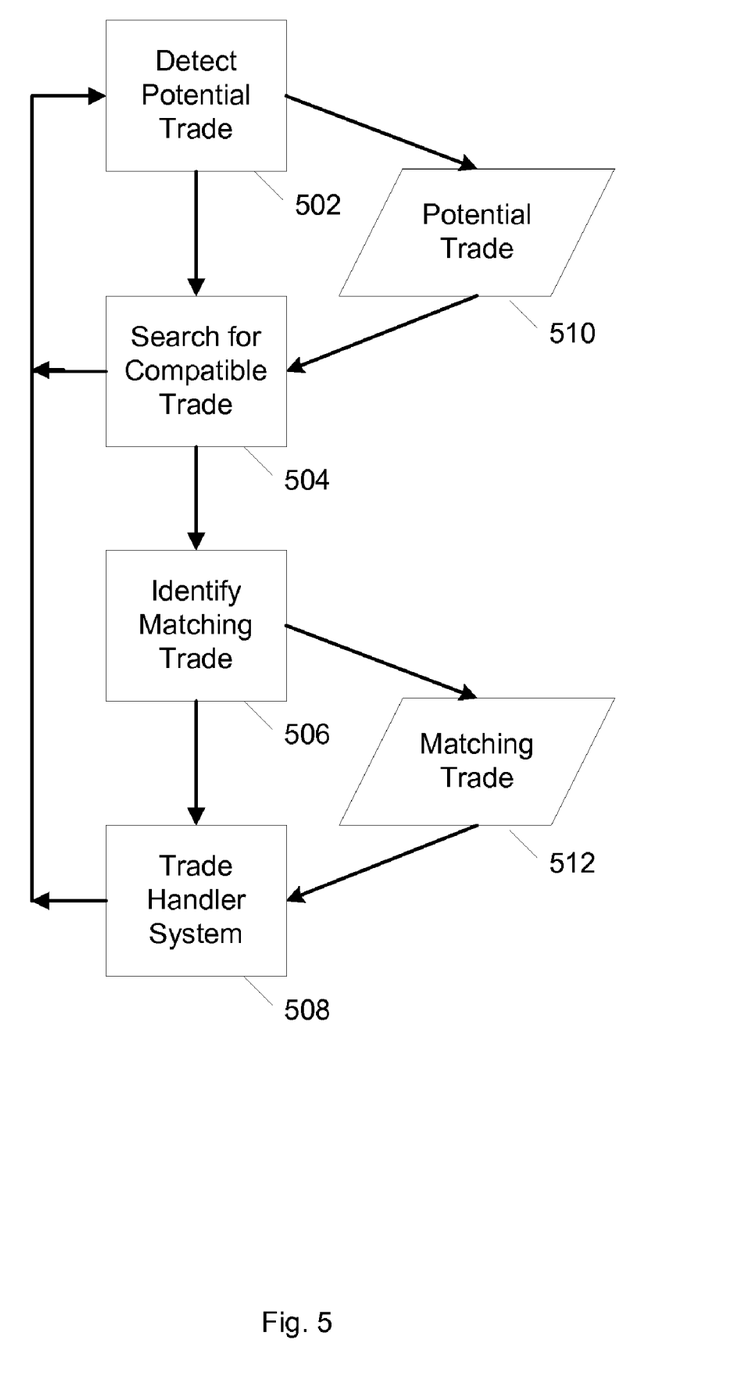
FIG. 5 is a block diagram illustrating an embodiment of the matching algorithm of the system for pairing traders of securities.
Figure 6:
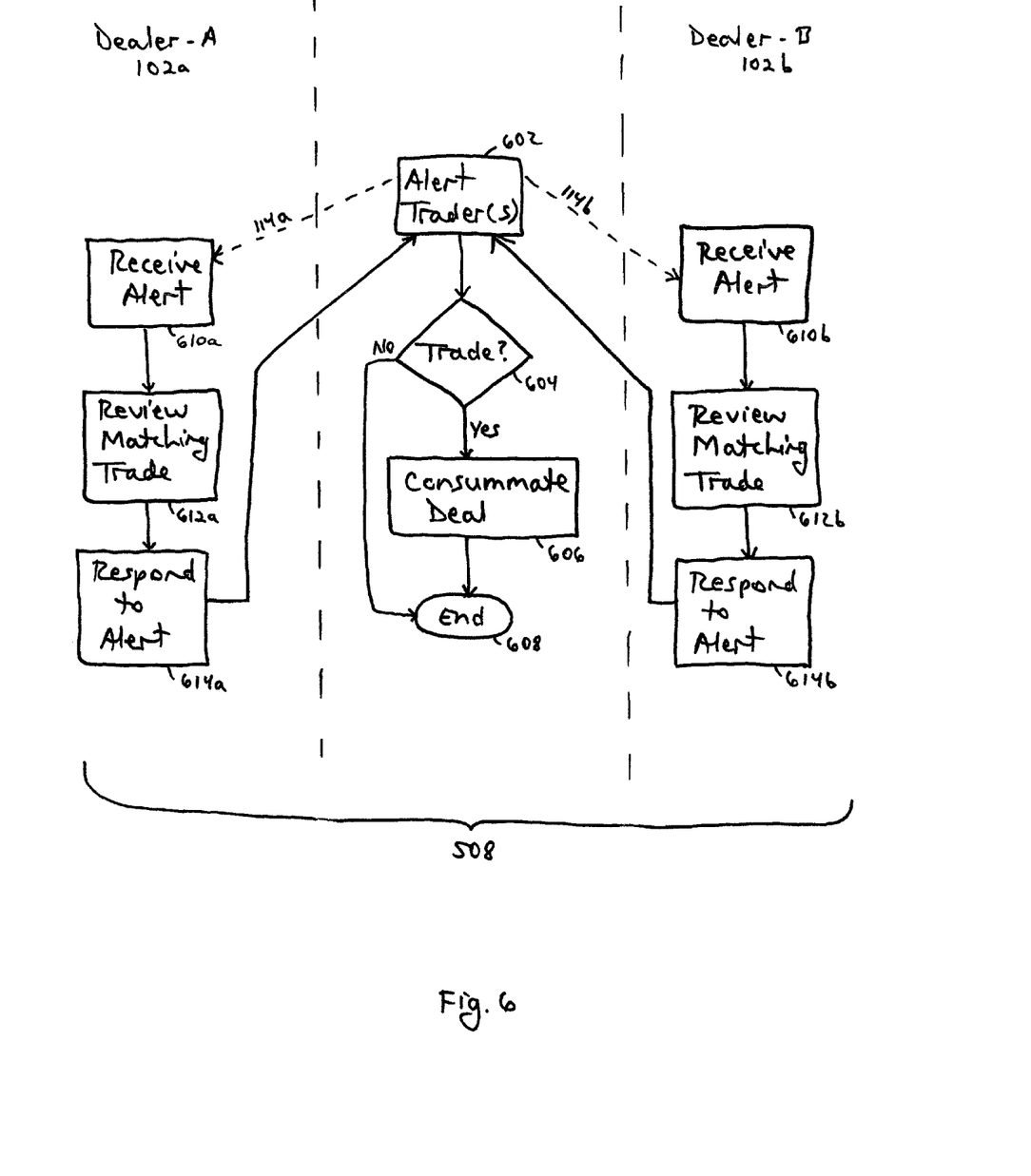
FIG. 6 is a block diagram illustrating the operation of the system to alert traders of trading opportunities and consummate deals between traders.

The operation of the system 100 is shown on FIGS. 5 and 6. Also, for convenience purpose only, the present invention is described in terms of three dealers, Dealer-A 102a, Dealer-B 102b, and Dealer-N 102n. However, the system 100 is adaptable to any number of dealers 102.

Upon a client, e.g., client-A 112a, logging into the system 100 via the client tier 202, the system 100 detects 502 if a potential trade exists. If a potential trade exists, the system 100 will notify either the salesperson covering the relevant client 112 account or an associated trader 108 of the potential trade.

A beneficial aspect of the system 100 is that during processing of the aggregated data from all dealers 102 the executing algorithms not only look for exact matches of interest to trade, but also look for potential trading interest between parties. Exact matching is what occurs on typical financial exchanges and, in particular, on electronic matching venues (ECNs). A major differentiating point of this system and method over the prior art is that it searches for and identifies potential trading interest in addition to attempting to intersect actual trading interest as is typically done on electronic matching facilities. Potential trading interest covers a wide range of possibilities, but is preferably directed to the many reasons for why a trade might occur. In one embodiment, and for convenience purpose only, potential trading interest occurs because of any one or more of the following reasons:

A chance to profit by buying or selling a bond at an attractive price

A chance to buy or sell something that a client was already active in

A chance to buy or sell something from/to a client who had previously traded that security A chance to buy or sell something from/to a client based on the client's expressed interest A chance to buy or sell something profitably based on observed movements in price in the market A chance to buy or sell something to arbitrage a price discrepancy between cash and derivatives markets.

A chance to buy or sell something from/to a client to improve a desired characteristic of their portfolio Each of the above criteria is applied against each dealer's 102 holdings as well as their clients' 112 holdings, trading history and expressed interest in particular securities. This result is matched with every other dealer 102 participating in the system and those dealers' clients 112. The net result is that the community of participants on the system and their clients 112 form a set of potential trading partners with each dealer 102 and their clients 112 being a potential trading partner of every other dealer 102 and his clients 112. Rather than a trading exchange where the community of users are matching specific stated securities to trade, in this community, potential interest to trade is matched against other potential interest and brought to the attention of the two potential participants in the trade.

If a potential trade 510 is detected, processing proceeds to search 504 other dealers 102 for a compatible trade. If no compatible trade is found, then processing returns to operation 502 until a new potential trade is detected. Once a compatible trade is found, processing continues in order to identify 506 a matching trade 512. Upon identifying 506 a matching trade 512, the system 100 initiates a trade handler system 508 to notify the appropriate traders 108, at the respective dealers' 102 desks, that a matching trading 512 has been detected and identified. Traders 108 are not told the identity of either the other trader 108 or the other trader's clients 112. In an alternate embodiment, the traders 108 know the identity of the other trader 108, but not the trader's client 112. The trade handler system 508 also receives responses from the traders 108 about the matching trade 512, and if desired, consummates 606 the trade by having it settled by a neutral clearing party that shields the trading client's 112 identity. In an embodiment where the traders 108 know the identity of the other trader 108, or where traders 108 have identified themselves to each other, or where the traders 108 belong to the same dealer 102, it may be possible to trade directly without using a neutral clearing party.

The operation of the trade handler system 508 is shown on FIG. 6. Processing starts with the trade handler system 508 alerting 114a, 114b the traders 108, such as trader 108a of Dealer-A 102a and trader 108b of Dealer-B 102b, that a matching trade 512 has been identified. There are several different notification schemes for the system 100. In one embodiment, the alert handler system 508 alerts 114a, 114b both traders 108a, 108b about the matching trade 512 simultaneously. In another embodiment, the alert handler system 508 initially alters 114b only the trader 108b of Dealer-B 102b. In yet another embodiment, the alert handler system 508 initially alerts 114a only the trader 108a of Dealer-A 102a.

The operation of a trader 108 upon receipt of an alert 114 is described in terms of trader 108a of Dealer-A 102a only for convenience. Each trader 108 receiving an alert 114 performs essentially the same functionality. Upon receipt of an alert 114a, the trader/sales person application 208 of the corresponding client tier 202 receives 610a the alert 114a and the matching trade 512 is reviewed 612a to determine whether the trader 108a or client 112a likes the matching trade 512. The trader 108 at this time may contact his client or the appropriate sales person 110a to either get approval to make the trade or to negotiate the details of the trade. Once the trader 108 determines whether to accept the matching trade 512 or not, the trader 108a responds 614a to the alert 114a by sending notice back to the data center 104 operating in the middle tier 204.

As noted above, trader 108b of Dealer-B 102b follows the same procedure as described above for Dealer-A 102a. That is, trader 102b receives 610b the alert 114b, reviews 612b the matching trade, and responds 614b to the alert 114b.

Upon receiving the responses from the traders 108a, 108b, the alert handler system 508 determines 604 if the matching trade 512 is to be consummated. If there is not to be a trade, then processing ends 608. If there is to be a trade, then the trade is consummated 606. The matching trade 512 settles as per conventional e-trading practices and processes, with the exception that the identity of the traders 108a, 108b and Dealer-A 102a, and Dealer-B 102b are kept anonymous. Processing then ends 608.

In this embodiment both the trader 108a of Dealer-A 102a and the trader 108b of Dealer-B 102b receive alerts 114 at the time a matching trade 512 is identified. In an alternative embodiment, the trade handler system 508 initially only sends an alert 114 to one of the traders 108 of a matching trade 512. For example, when a trader 108 enters an inquiry about a potential trade 510 into the system 100, alerts 114 are sent only to those traders 108 with potentially matching trades 512, but not the trader 108 who entered the inquiry regarding the potential trade 510 into the system 100. Only when one of the traders 108 alerted as having potentially matching trades 512 accepts, will the trader 108 who entered the inquiry become aware of a potentially matching trade 512. In this fashion, those traders 108 who received the alert 114 will be further screened from potential communications from the trader 108 who originally entered the inquiry.

As another example, Dealer-A 102a is axed in a particular bond ABC. The system 100 detects 502 that Client B 112b of Dealer-B 102b has been accumulating this ABC bond over the past few months. The system 100 alerts a trader 108b of Dealer-B 102*b* that there is an axe out in the dealer community that may be of interest to Client B 112*b*. If trader 108*b* of Dealer-B 102*b* is interested in pursuing this opportunity, he approves the alerting of Dealer-A 102*a* of the potential inquiry, not giving up either his trader name, his dealer name, or his client name. Once both Dealer-A 102*a* who is axed in the bond and Dealer-B 102*b* who has the client interest have both expressed interest in following up on this opportunity, they are put in touch electronically, but anonymously. The respective traders 108*a*, 108*b* can then follow up on the opportunity by determining a price for the axe, contacting the prospective Client B 112*b* and determining if a trade is to be consummated.

If a trade is consummated, the system 100 preserves anonymity between all of the traders 108 and dealers 102. In the above example, Client B 112*b* of Dealer-B 102*b* trades with Dealer-B 102*b* and Dealer-B 102*b* in turn makes an automatic opposite trade with an intermediary clearing broker who serves the purpose of clearing trades between dealers anonymously. Dealer A in turn makes a corresponding automatic trade with the clearing broker. If the axe within the system 100 at Dealer-A 102*a* was in fact an expression of a client A's 112*a* interest, then Dealer-A 102*a* after consummating the deal with the clearing broker makes a final trade with client A 112*a*. This series of trades through a common intermediary broker preserves anonymity and is represented as follows:

Client A 112*a*→Dealer-A 102*a*→clearing broker→Dealer-B 102*b*→Client B 112*b*

In this way, although ultimately clients of two different dealers 102*a*, 102*b* end up trading (selling and buying) a bond, neither of the two dealers 102*a*, 102*b*, nor either of the two clients 112*a*, 112*b*, learns the identity of who is on the other side of the trade. This anonymity is essential in the markets to allow dealers 102 the security to share their clients' 112 trading interests with other dealers 102 without the fear of potentially being cut out of the trade by another dealer 102.

The system 100 comprises the following core aspects:

The system 100 is a multi-user system, with traders 108 and salespeople 110 on the fixed income sell-side desk being the prime participants.

The system 100 comprises a combination of workflow and idea generation features.

The system 100 encompasses bi-directional communication whereby a trader 108 communicates offerings of specific securities or general interest that he may have. In turn, salespeople 110 communicate a client 112 inquiry anonymously amongst the other salespeople 110 and traders 108.

The system 100 captures all data entered into the system by all users on the system 100 and preserves it for future analysis. In addition, external data sets, such as trades, market data, securities master, research and credit analysis are input automatically into the system 100.

The system 100 analyzes all of the data in the system 100 relative to client 112 trading patterns and current and previous client 112 interest and exposes opportunities to sell particular fixed income securities within the system 100 to a particular client 112 or to consummate a swap or trade between two clients 112. The system 100 does so automatically while preserving anonymity of the potential client 112.

The unique aspect of the system 100 is that the system 100 not only exposes opportunities for trades between clients 112 of a single trading desk, but is also able to expose trading opportunities between clients 112 of one dealer 102 with those of another dealer 102. Likewise, the system 100 exposes opportunities to trade between one dealer's 102 trading desk and another dealer's client 112 or traders 108.

CONCLUSION

While various embodiments of the present invention have been described above, it should be understood that they have been presented by the way of example only, and not limitation. It will be understood by those skilled in the art that various changes in form and details may be made therein without departing from the spirit and scope of the invention as defined. Thus, the breadth and scope of the present invention should not be limited by any of the above-described exemplary embodiments.

What is claimed is:

1. A system for anonymous communications between a first dealer and a second dealer to detect and propose a trade, comprising:
    a first dealer subsystem having a first dealer and maintaining first trade information for a plurality of first clients;
    a second dealer subsystem having a second dealer and maintaining second trade information for a plurality of second clients;
    a means for said first dealer subsystem to communicate with said second dealer subsystem;
    a means for identifying a matching trade between a first client of said first dealer subsystem and a second client of said second dealer subsystem while maintaining anonymity of said first dealer and second dealer, wherein said means for identifying said matching trade comprises searches of said first trade information and said second trade information, an analysis of said first client's trading patterns and said second client's trading patterns, and where an actual trading interest in said matching trade is not specifically stated by either or both said first client or said second client, and;
    a means for alerting said first dealer about said matching trade while maintaining anonymity of said second dealer and said second client.

2. The system of claim 1, wherein said means for identifying comprises:
    a means for analyzing said first trade information for a first potential trade;
    a means for analyzing said second trade information for a second potential trade; and
    a means for creating said matching trade derived from said first potential trade and said second potential trade.

3. The system of claim 1, wherein each of said first trade information and said second trade information is selected from the group consisting of: a potential profit of said matching trade, whether said first client is active in said matching trade, whether said second client is active in said matching trade, whether said second client expressed an interest in said matching trade, whether a profit opportunity exists due to market price fluctuations, whether a profitable arbitrage position exists, and whether said matching trade would improve a portfolio of said second client.

4. The system of claim 1, further comprising:
    a means for said first dealer to alert said second dealer about said matching trade, providing matching trade information to said second dealer while maintaining anonymity of said first dealer.

5. The system of claim 4, wherein said means for alerting said first dealer is selected from a group consisting of a visual signal and an audible signal, and said means for said first dealer to alert said second dealer is selected from a group consisting of a visual signal and an audible signal.

6. The system of claim 1, wherein said means for alerting is selected from a group consisting of a visual signal and an audible signal.

7. The system of claim 1, further comprising a means for said second dealer to notify said first dealer of an acceptance of said matching trade.

8. The system of claim 1, further comprising a means for consummating said matching trade.

9. The system of claim 1, wherein said matching trade is in a fixed income market.

10. The system of claim 1, wherein said means for said first dealer subsystem to communicate with said second dealer subsystem comprises said first dealer operating in a first client tier of a computer network, said second dealer operating in a second client tier of said computer network, and said first client tier and said second client tier communicating through a single data center.

11. The system of claim 1, wherein said first dealer is selected from a group consisting of a salesperson and a trader, and said second dealer is selected from a group consisting of a salesperson and a trader.

12. The system of claim 1, wherein said means for identifying said matching trade is further derived from external data selected from a group consisting of historical trades, market data, securities master, market research, and credit analysis.

13. The system of claim 1, wherein said first dealer is remotely located from said second dealer.

14. The system of claim 1, wherein said first dealer and said second dealer are the same dealer.

15. A method for communicating anonymously between a first dealer and a second dealer to detect and propose a trade, comprising:
maintaining first trade information by a first dealer for a plurality of first clients, said first dealer having a first dealer subsystem;
maintaining second trade information by a second dealer for a plurality of second clients, said second dealer having a second dealer subsystem;
communicating between said first dealer subsystem and said second dealer subsystem;
identifying a matching trade between a first client of said first dealer subsystem and a second client of said second dealer subsystem while maintaining anonymity of said first dealer and said second dealer, wherein identifying said matching trade comprises searching said first trade information and said second trade information, and analyzing said first client's trading patterns and said second client's trading patterns, and where an actual trading interest in said trading match is not specifically stated by either or both said first client or said second client; and
alerting said first dealer about said matching trade while maintaining anonymity of said second dealer and said second client.

16. The method of claim 15, wherein identifying comprises:
analyzing said first trade information for a first potential trade;
analyzing said second trade information for a second potential trade; and
creating said matching trade derived from said first potential trade and said second potential trade.

17. The method of claim 15, wherein each of said first trade information and said second trade information is selected from the group consisting of: a potential profit of said matching trade, whether said first client is active in said matching trade, whether said second client is active in said matching trade, whether said second client expressed an interest in said matching trade, whether a profit opportunity exists due to market price fluctuations, whether a profitable arbitrage position exists, and whether said matching trade would improve a portfolio of said second client.

18. The method of claim 15, further comprising:
alerting said second dealer by said first dealer about said matching trade; and
providing matching trade information to said second dealer while maintaining anonymity of said first dealer.

19. The method of claim 18, wherein alerting said first dealer is accomplished by a signal selected from a group consisting of: a visual signal and an audible signal, and alerting said second dealer by said first dealer is accomplished by a signal selected from a group consisting of a visual signal and an audible signal.

20. The method of claim 15, wherein alerting is selected from a group consisting of a visual signal and an audible signal.

21. The method of claim 15, further comprising notifying said first dealer by said second dealer of an acceptance of said matching trade.

22. The method of claim 15, further comprising consummating said matching trade.

23. The method of claim 15, wherein said matching trade is in a fixed income market.

24. The method of claim 15, wherein communicating between said first dealer subsystem and said second dealer subsystem comprises said first dealer operating in a first client tier of a computer network, said second dealer operating in a second client tier of said computer network, and said first client tier and said second client tier communicating through a single data center.

25. The method of claim 15, wherein said first dealer is selected from a group consisting of a salesperson and a trader, and said second dealer is selected from a group consisting of a salesperson and a trader.

26. The method of claim 15, wherein identifying said matching trade is based at least in part on external data selected from a group consisting of historical trades, market data, securities master, market research, and credit analysis.

27. The method of claim 15, wherein said first dealer is remotely located from said second dealer.

28. The method of claim 15, wherein said first dealer and said second dealer are the same dealer.

* * * * *